United States Patent [19]

Yip et al.

[11] Patent Number: 5,333,957

[45] Date of Patent: Aug. 2, 1994

[54] BALL BEARING WITH SEAL

[75] Inventors: Kee Keng Yip; Hirofumi Shigenobu; Kyoji Kato; Takuya Sato; Nobuo Yagami, all of Singapore, Singapore

[73] Assignee: Minebea Kabushiki Kaisha, Nagano, Japan

[21] Appl. No.: 18,088

[22] Filed: Feb. 16, 1993

[51] Int. Cl.$^5$ .............................................. F16C 33/76
[52] U.S. Cl. .................................. 384/484; 384/477; 277/96.2
[58] Field of Search ..................... 384/477, 482, 484; 277/96.2

[56] References Cited

U.S. PATENT DOCUMENTS

| | | | |
|---|---|---|---|
| 3,554,621 | 1/1971 | McAllister | 384/484 |
| 3,700,296 | 10/1972 | Bugmann | 384/484 |
| 4,309,063 | 1/1982 | Weis | 384/482 |
| 4,588,312 | 5/1986 | Dickinson et al. | 384/484 X |
| 4,805,919 | 2/1989 | Wiblyi et al. | 384/477 X |
| 5,000,588 | 3/1991 | Prinz | 384/477 |
| 5,110,159 | 5/1992 | Herold et al. | 384/490 X |

Primary Examiner—Thomas R. Hannon
Attorney, Agent, or Firm—Frishauf, Holtz, Goodman & Woodward

[57] ABSTRACT

In a ball bearing, a shielding plate (5), which is injection-molded into one piece from a polyacetal resin which is adequate in all of rigidity, Flexibility and resiliency, is interposed between an inner race (1) and an outer race (2) in a side off the bearing to protect the interior of the bearing From dust and moisture. In assembling, the shielding plate (5) has its outer peripheral portion resiliently deformed and fitted into an inner annular groove (2a) of the outer race (2), and does not affect the outer race (2) in dimension thereof at all after completion of the assembling.

5 Claims, 2 Drawing Sheets

BALL BEARING WITH SEAL

BACKGROUND OF THE INVENTION

1. Field of the Invention

The present invention relates to a shielded bearing provided with a shielding plate, and more particularly to a shielded ball bearing in which the shielding plate is molded into one piece from a polyacetal alloy resin.

2. Description of the Prior Art

It is well known to provide a shielding plate in a ball bearing in which a plurality of ball are interposed between an inner race and an outer race, and protected from dust by means of such shielding plate.

A conventional shielding plate is made of metals, or constructed of a metallic core plate with which a synthetic sealing rubber is molded to cover the core plate.

In case of the conventional shielding plate made of metals, the shielding plate is mounted on the outer race of the ball bearing and held therein by a snap ring having an appropriate resiliency. Consequently, in this case, two kinds of metals, i.e., one for the shielding plate and the other for the snap ring, are required, which increases manufacturing costs as to materials.

Further, in assembling, the snap ring snaps into an annular groove (which is formed in an inner surface of the outer race) to cause the outer race to vary in outer diameter. Such variation in outer diameter is particularly large in a miniature bearing which is considerably affected in dimension by the snap ring.

In addition, the outer race is required to have a pair of inner annular grooves; i.e., one For the shielding plate and the other for the snap ring. Due to this, the shield plate requires two steps in its assembling process, which increases the manufacturing cost of the ball bearing and causes many problems.

In a manufacturing process of the shielding plate constructed of the metallic core plate with which the synthetic sealing rubber is molded to cover the core plate, the core plate for providing the rigidity is previously press-formed; then, the synthetic rubber is placed on the core plate and subjected to heat and pressures, so that the rubber is molded to cover the core plate; and, thereafter, the thus molded rubber covering the core plate is blanked with a press to form the shielding plate. As is clear from the above, the manufacturing process of the shielding plate has many steps, and, is therefore costly.

SUMMARY OF THE INVENTION

It is an object of the present invention to provide a ball bearing provided with a shielding plate which does not require two different materials in manufacturing and can be injection-molded from a single material through a single step of a manufacturing process, the single material being provided with the properties of sealability and rigidity.

In the ball bearing of the present invention, the shielding plate is molded into one piece from a polyacetal-alloy resin or polyoxymethylene resin, the resins being provided with the properties of rigidity, flexibility and resiliency.

Since the shielding plate of the ball bearing of the present invention uses the polyacetal-alloy resin or polyoxymethylene resin, the shielding plate can be injection-molded into such one piece.

Further, in assembling of the shielding plate with the ball bearing of the present invention, the shielding plate has its outer peripheral portion easily snapped into an annular mounting groove (which is formed in an inner surface of an outer race of the ball bearing) under the influence of a resilient force exerted by the shielding plate itself.

Furthermore, in contrast with the conventional shielded ball bearing using the metallic snap ring, in the ball bearing of the present invention using the shielding plate, there is no fear that the shielding plate affects the outer race in dimension of its outer diameter. The use of the shielding plate makes it possible for the present invention to provide a precise miniature ball bearing adapted particularly for ultra-precision instruments.

DESCRIPTION OF THE PREFERRED EMBODIMENTS

Now, the present invention will be described in detail with reference to the accompanying drawings.

Figure 1:
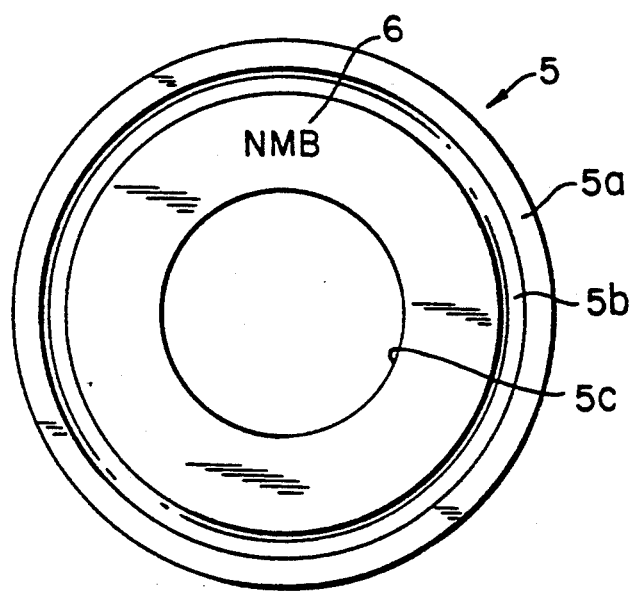
FIG. 1 is a front view of an embodiment of the shielded ball bearing of the present invention.
Figure 2:
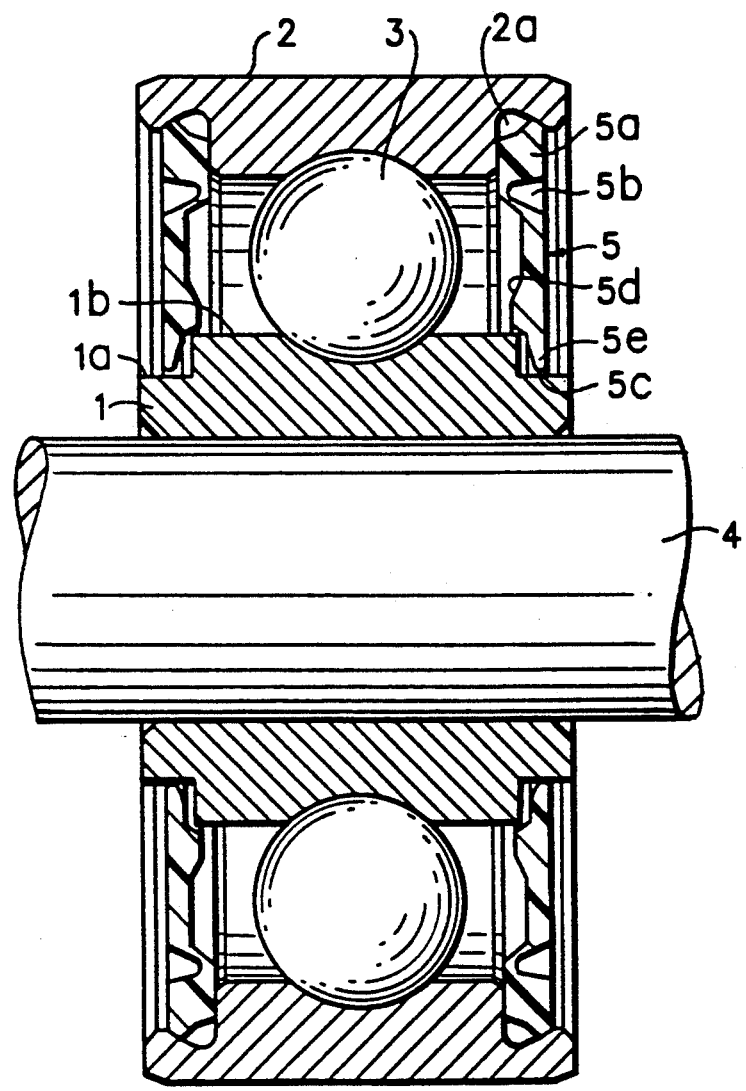
FIG. 2 is a cross-sectional view of the ball bearing of the present invention, taken along a center line of the bearing shown in FIG. 1.

FIGS. 1 and 2 show an embodiment of a shielded ball bearing of the present invention.

In the drawings: the reference numeral 1 denotes an inner race; 2 an outer race; 3 each of a plurality of balls interposed between the inner race 1 and the outer race 2; 4 a shaft; and, 5 a shielding plate For filling a gap between the inner race 1 and outer race 2 in a side of the ball bearing. In this embodiment of the present invention, the shielding plate 5 is injection-molded into one piece from a polyacetal-alloy resin, and is adequate in rigidity and resiliency.

The shielding plate 5 assumes a disk-like shape, and has its outer peripheral portion 5a formed into a thick portion which is fitted into an annular mounting groove 2a formed in an inner surface of the outer race 2 in the vicinity of a side surface thereof. In a portion radially adjacent to this outer peripheral portion 5a of the shielding plate 5, there is formed an annular groove 5b which faces outward and permits the shielding plate 5 to be resiliently deformed in any direction. In a central portion of the shielding plate 5, there is formed a large-diameter hole 5c which is slightly larger in diameter than an outer diameter of a small-diameter end portion of the inner race 1. In an inner surface portion of the shielding plate 5 concentrically adjacent to the hole 5c, there is formed an annular ridge portion 5d which slightly extends over a large-diameter surface portion 1b of the inner race 1. As shown in FIG. 1, an outer surface of the shielding plate 5 is marked with a product number and a company name 6 by printing, stamping and the like.

In assembling, the shielding plate 5 has its outer peripheral portion 5a adequately deformed using its resiliency to permit itself to fit into the mounting groove 2a of the outer race 1, so that the shielding plate 5 is mounted on a side-end portion of the outer race 2.

At this time, the central hole 5c of the shielding plate 5 has an inner peripheral edge of its inner peripheral sealing lip 5e brought into contact with an outer peripheral surface of the small-diameter end portion 1a of the inner race 1. In addition, the shielding plate 5 has the annular ridge portion 5d of its inner surface extend over the large-diameter surface portion lb of the inner race 1. As a result, the shielding plate 5 fills in the gap between the inner race 1 and the outer race 2 in the side of the ball bearing.

In the present invention:
a composite material consisting of, for example,
a 40 to 99.5% by weight of acetal resin, and
a 60 to 0.5% by weight of thermoplastic polyester elastomer, is mixed with
a 0.01 to 5% by weight of isocyanate compound to produce the polyacetal-alloy resin used in the present invention. Such polyacetal-alloy resin is excellent in resistance to impact.

Further, in the present invention, it is also possible to use a composite material comprising a polyoxymethylene resin which is one of polyacetal resins, the composite material consisting of, for example:
a 50 to 97% by weight of polyoxymethylene resin; and
a 3 to 50% by weight of polyester copolymer.

A preferable polyester copolymer comprises: aliphatic diols as its alcohol component, the aliphatic diols comprising ethylene glycol, propanediols, butanediols and the like; and, saturated aliphatic dicarboxylic acids as its acid component, the saturated aliphatic dicarboxylic acids comprising succinic acid, glutaric acid, adipic acid and the like.

The use of this polyoxymethylene resin makes it possible For the shielding plate 5 to be excellent in resistance to impact and in its decorative properties (i.e., in paintability and in its hot-stamping properties in marking and the like).

In the present invention, since the shielding plate 5 is injection-molded into one piece from the polyacetal-alloy resin or polyoxymethylene, the shielding plate 5 of the ball bearing of the present invention requires only one material in contrast with the conventional metallic shielding plate or that having the rubber molded together with the metallic core plate. Therefore, it is possible for the shielding plate 5 of the ball bearing of the present invention to save its material cost.

Further, in assembling, it is possible for the shielding plate 5 of the ball bearing of the present invention to have its outer peripheral portion resiliently deformed and fitted into the mounting groove 2a of the inner surface of the outer race 2 of the bearing in an easy manner, which facilitates the assembling operation of the shielding plate 5 of the ball bearing.

In addition, in contrast with the conventional shielded ball bearing using the snap ring, the shielding plate 5 used in the ball bearing of the present invention does not affect the outer race 2 of the bearing in dimension of its outer diameter at all, and, therefore makes it possible to provide a precision miniature ball bearing adapted for ultra-precision instruments.

Incidentally, in the ball bearing of the present invention, when the polyoxymethylene resin is used as the polyacetal resin in the shielding plate 5, such shielding plate 5 is excellent in printing properties which enable the shielding plate 5 to be marked with a product name and a company name, and Further enables the shielding plate 5 to be easily printed with a thermoset-urethane ink. The shielding plate 5 thus marked with the names enables workers in assembling to easily confirm a front and a rear side of the shielding plate 5, which facilitates the assembling operation of the ball bearing of the present invention.

What is claimed is:
1. In a ball bearing comprising:
(a) an inner race, an outer race, a plurality of balls interposed between said inner race and said outer race, and a shielding plate for filling a gap between said inner race and said outer race in a side of said ball bearing;
the improvement wherein:
(b) said shielding plate is molded into one piece from a polyacetal-alloy resin which is adequate in all of rigidity, flexibility and resiliency, and
(c) said polyacetal-alloy resin being a composite material comprising:
40 to 99.5% by weight of an acetal resin; and
60 to 0.5% by weight of a thermoplastic polyester elastomer.
2. In a ball bearing according to claim 1, wherein said shielding plate has a single hinge.
3. In a ball bearing according to claim 5, wherein said composite material is mixed with 0.01 to 5% by weight of an isocyanate compound.
4. In a ball bearing comprising:
(a) an inner race, an outer race, a plurality of balls interposed between said inner race and said outer race, and a shielding plate for filling a gap between said inner race and said outer face in a side of said ball bearing;
the improvement wherein:
(b) said shielding plate is molded into one piece from a polyoxymethylene resin which is adequate in all of rigidity, flexibility and resiliency, and
(c) said polyoxymethylene resin being a composite material comprising:
50 to 97% by weight of polyoxymethylene resin; and
50 to 3% by weight of a polyester copolymer.
5. In a ball bearing according to claim 4, wherein said shielding plate has a single hinge.

* * * * *